United States Patent [19]
Johnson

[11] 3,845,792

[45] Nov. 5, 1974

[54] FUEL-DISPENSING NOZZLE SEAL

[75] Inventor: Everett M. Johnson, Fishkill, N.Y.

[73] Assignee: Texaco Inc., New York, N.Y.

[22] Filed: Oct. 24, 1972

[21] Appl. No.: 300,076

[52] U.S. Cl.................. 141/46, 141/52, 141/198
[51] Int. Cl.................. B65b 31/06, B67d 5/372
[58] Field of Search.......... 141/45, 46, 52, 59, 287, 141/312, 392, 198-229; 239/569

[56] References Cited
UNITED STATES PATENTS
1,599,497 9/1926 Shields................................. 141/46
2,908,299 10/1959 Gosselin............................. 141/287

Primary Examiner—Houston S. Bell, Jr.
Attorney, Agent, or Firm—T. H. Whaley; C. G. Ries

[57] ABSTRACT

A dispensing nozzle for transferring a volatile liquid such as a gasoline, from a pressurized source thereof to a receptacle such as a vehicle fuel tank having a filler spout. The dispensing nozzle includes a discharge tube which removably registers in said filler spout. An expandable, liquid inflatable member is carried on said discharge tube to be expanded when properly registered within said spout. The said member thereby forms a peripheral seal within the annular passage defined by adjacent walls of said inlet spout and said tube respectively, whereby to avoid escape of vapors to the atmosphere as liquid is forced into the vehicle tank.

6 Claims, 3 Drawing Figures

FUEL-DISPENSING NOZZLE SEAL

BACKGROUND OF THE INVENTION

During the fueling of a vehicle such as an automobile, boat, airplane or the like, a vaporizable fuel in liquid phase is normally introduced to the fuel tank in a pressurized stream. Although said fuel tank is usually empty or only partially empty prior to the filling operation, it will normally be relatively full of vapors from residual fuel.

As the liquid fuel is introduced to the partially empty tank, said vapors will be forced from the tank usually through the filling spout. Further, said vapors will be passed directly into the atmosphere. It is known that in confined areas, the continuous passage of such fumes into the atmosphere constitutes a combustible hazard. In open areas these vapors contribute to air pollution.

Toward overcoming this developing problem, states and municipalities have attempted to legislate against air polluting acts with varying degrees of success. As a matter of practicality, it is becoming more essential that with the increased use of automotive fuels for vehicles utilizing internal combustion engines, some form of compatible system must be developed. Essential to such a system is that it either confine the fuel to a closed circuit, or otherwise preclude the passage of fuel vapors into the atmosphere.

In the system as presently disclosed, to illustrate the invention a normal automobile filling station is utilized as the means for transferring fuel to passenger vehicles, trucks and the like. In such an installation the station's fuel tanks are normally buried beneath the earth and the liquid fuel pumped therefrom. The latter is passed directly into a receiving fuel tank of a vehicle by way of the usual metering and control devices.

To avoid the expected vapor leakage from the vehicle fuel tank during the transfer operation, the fuel dispensing nozzle includes an expandable resilient ring. When in the expanded position, said ring will sealably engage the vehicle fuel tank filler spout in a manner to form a vapor tight annular seal therewith. Thus, as the fueling operation is carried out, vapors will be confined to the system and returned to the fuel source, or otherwise absorbed in an alternate receptacle.

DESCRIPTION OF THE DRAWINGS

Referring to the drawings, FIG. 1 illustrates diagrammatically a system of the type contemplated in which a fuel source, normally and hereafter referred to as a service station 10, includes at least one and usually a plurality of underground tanks 11 which contain gasoline or other volatile fuel. In the usual manner, tank 11 is provided with a means to withdraw the gasoline while simultaneously measuring the amount withdrawn. Thus, buried tank 11 includes an elongated conduit 12, the conduit lower inlet end being adjacent to the tank lower side. Conduit 12 extends to a point above the ground and is communicated with pumping means 13.

Figure 1:
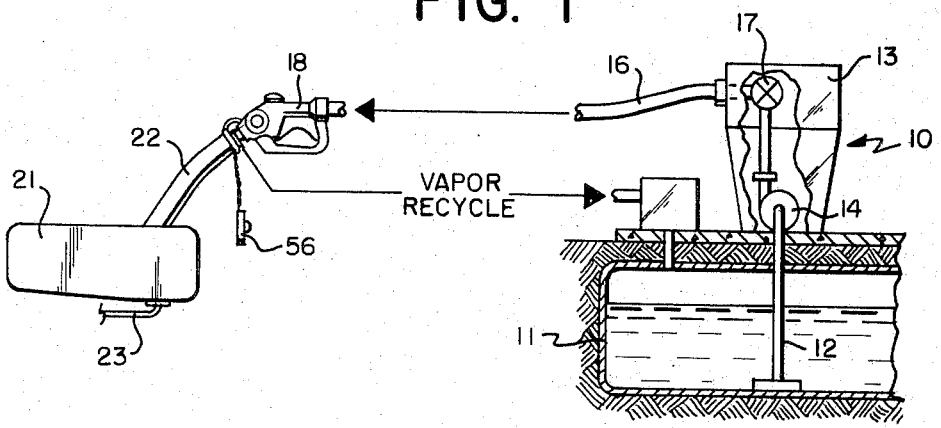
FIG. 1 illustrates an environmental view, in partial cross section of the instant invention.

The gasoline pumping means 13 includes essentially an electrically operated pump 14 having an inlet side communicated with said conduit 12, and a discharge side communicated with an elongated hose 16. Flow measuring and control means such as valve 17 are interposed in hose line 16 to facilitate the transfer operation. A dispensing nozzle 18 depends from the remote end of hose 16 and includes a manually operable valve means 19 actuable to regulate fuel flow through the nozzle.

Pumping means 13 in the usual manner includes valve arrangement 17 which is manually operable to initiate the action of the pump 14 in drawing gasoline from tank 11. Vehicle fuel tank 21 is normally contained in such a manner to be accessible external to the vehicle. Thus, said tank 21 is provided with a filler pipe or spout 22 extending from the tank interior, to the side or rear of the automobile.

A removable cap 56 normally fixed to the filler spout upper end serves as a closure to the tank. A discharge line 23 connected to the tank further includes a pump or other means for initiating fuel flow when the automotive system is operated.

Figure 2:
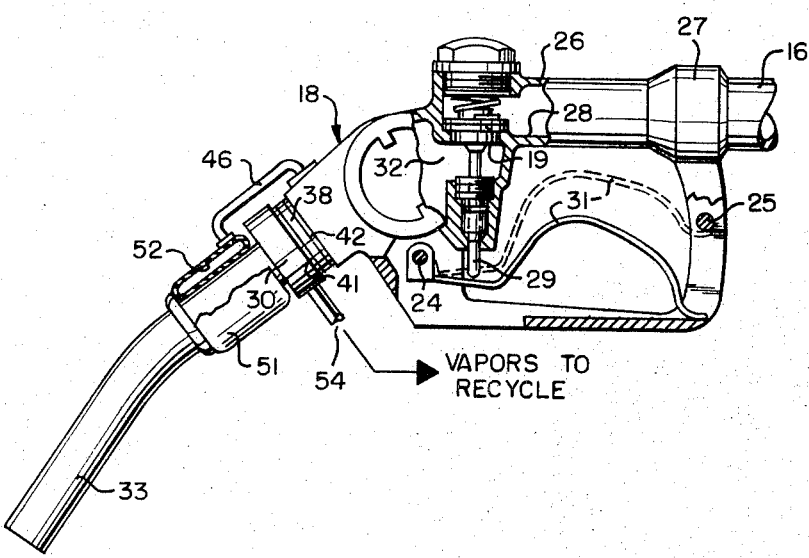
FIG. 2 is an enlarged segmentary view of the dispensing nozzle shown in FIG. 1.

Referring to FIG. 2, nozzle 18 depending from hose 16, is normally slidably received in cylindrical filler spout 22. Thus, upon actuation of nozzle valve 19, a fuel flow will be passed from storage tank 11, into the vehicle tank 21.

Said nozzle 18 basically includes a central body 26 having an inlet 27 thereof communicated with the pressurized source of the fuel. Body 26 includes a first passage 28 having valve means 19 disposed in said passage which valve is provided with a plunger 29 which is slidably received in body 26 and pivotally connected to a manually operable lever 31.

To initiate flow of liquid through flow passage 28, lever 31 is lifted upwardly into the open position, to urge the actuating plunger upwardly whereby to open valve 19. Fuel flow through said valve 19 will then pass into nozzle chamber 32.

Figure 3:
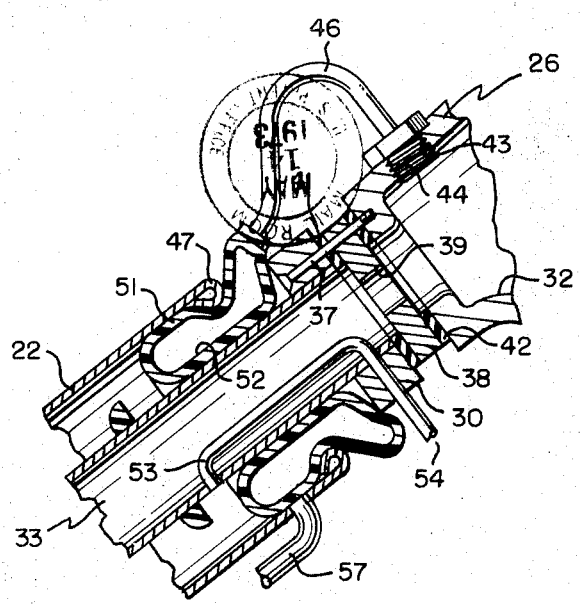
FIG. 3 is an enlarged segmentary view in vertical cross section of the nozzle shown in FIG. 1.

Referring to FIG. 3, nozzle 18 embodies a discharge tube 33 generally of cylindrical cross section and adapted to be slidably received in the passage defined by tank filler spout 22. One end of said discharge tube 33 is communicated with the nozzle body outlet chamber 32. Said discharge tube is of a sufficient length to be removably inserted into the filler tube 22 while maintaining its position during the fuel transfer.

Discharge tube 33 includes a circular flange 30 at the tube inlet end adapted to sealably engage the nozzle body 26 by suitable fastening means such as a plurality of fastening screws 37.

A thin orifice plate 38 is retained intermediate nozzle flange 30 and the engaging surface of nozzle body 26. Said orifice plate 38 includes a central opening 39 having a diameter substantially less than the diameter of both the chamber 32 and the nozzle discharge tube 33. Thus, fuel flow from chamber 32 into the central passage of nozzle 33, will be constricted at the orifice plate whereby to establish a pressure differential across the plate.

To form a fluid tight seal between the engaged body 26 and discharge tube 33 a pair of resilient gaskets 41 and 42 are provided and compressibly held and form a peripheral seal as the screws 37 are tightened into place.

A lateral port 43 is formed in body 26 whereby to discharge liquid therefrom as will be hereinafter noted. Said port 43 is provided with a threaded insert or similar member 44 having an upper portion extending from the body and adapted to removably engage an end of connector tube 46. Said connector tube extends forward of the flange 30 and communicates with the interior of an expandable seal ring 51.

Ring 51 comprises a torus shaped member formed with resilient walls, and having an inner diameter adapted to be slidably inserted along the length of tube 33 whereby to engage the latter while said ring is in either the expanded or contracted position. Ring 51 defines an inner inflatable chamber 52, which as noted is communicated with tube 46 whereby liquid fuel can be urged into said chamber to expand the outer walls of ring 51 into engagement with contiguous surfaces of spout 22.

During a normal operation, and as shown in FIG. 2, ring 51 is positioned at the end of discharge tube 33 adjacent to the flange 30. When in the uninflated position, ring 51 lies substantially flat along the tube surface to facilitate entry of discharge tube 33 into the filler spout 22. Thereafter, as ring 51 is inflated by the entry of liquid fuel thereinto, the outer walls of said ring expand to engage the peripheral rim 47 as noted in FIG. 3 thus forming an annular seal.

To best achieve the sealing function, ring 51 as noted is substantially flexible, embodying relatively thin resilient walls. However, the central portion of the inner wall of said ring in both expanded and contracted positions is preferably firmly engaged about the outer surface of discharge tube 33. Thus, the ring 51 inner walls are provided with a degree of elasticity through the use of an elastic material or elastic inserts formed within the walls of said ring. The outer expandable walls and the ends of ring 51 are preferably resilient to the extent as to be deformed outward when the ring is inflated, as shown in FIG. 3.

Ring 51 thus may be formed of a unitary wall thickness. However, it may also be formed of a composite wall, and made up of a plurality of joined segments so arranged to provide the inner elastic wall, as well as the outer expandable and more resilient wall.

Operationally, during the fueling of a vehicle tank 21, initially the tank filler cap 56 is removed from spout 22 to expose the inner passage thereof. Thereafter, nozzle 18 with ring 51 in the contracted position is inserted into said spout 22 a sufficient distance to register ring 51 adjacent to rim 30. During this period, there may be a minor amount of vaporized fuel vented from the tank 21 to the atmosphere. However, such egress will be a function of the temperature and pressure within tank 21.

To simultaneously form a closed connection between the vehicle tank 21 and nozzle 18, flow through the latter is initiated by manually urging lever 31 about its pivot point 24. In its displaced position, as shown in FIG. 2, lever 31 will be engaged by a stop member 25.

This movement of lever 31 displaces plunger 29 upward to initiate liquid fuel flow from chamber 28 through valve 19 and into chamber 32. Constricted opening or orifice 38 will thus cause a build-up of the fuel pressure whereby to urge a flow of the latter through lateral port 43 and connector tube 46, to the inner chamber 52 of ring 51.

The outward expansion of the exterior wall of said ring 51 will bring said walls into peripheral engagement with the rim 47 whereby to form the annular seal. It will also concurrently seal off vent line 57 on fill spout 22, a vent with which older cars are normally equipped. Simultaneously, fuel passing from chamber 34 into nozzle 33 will enter the fuel tank 21. Thereafter, as the level of liquid in said tank gradually increases, residual vapors will be urged through vapor exhaust line 53.

Fuel vapors from tank 21 as taken from 54, and exhaust line 53, are normally recycled and either condensed, or pumped back to the storage tank 11 to be recycled. In any event, the filling operation of tank 21 will continue with the tube 51 in expanded position until such time as tank 21 becomes filled.

Thereafter, and while not presently shown, the fuel flow will be terminated either automatically or manually. In the instance of an automatic termination of said flow, as well known in the art of such fuel dispensing nozzles, lever 31 is dislodged from its displaced position and permitted to return to its original position as shown in FIG. 2. The mechanism to achieve this fuel shut off is well known in the art, illustrative of which is shown in U.S. Pat. No. 3,586,069.

As plunger 29 returns to its original position, valve 19 will be closed thereby discontinuing fuel flow therethrough. As residual fuel drains from chamber 32, pressure in the latter will be decreased such that the fuel from inner chamber 52 of ring 51 will drain back through tube 46 and into said chamber 32. As the fuel is completely exhausted from chamber 52 the ring will contract to its original disposition as shown in FIG. 2, about tube 33.

Nozzle 18 can thereafter be withdrawn from filler spout 22, and filler cap 56 replaced whereby to avoid further evaporation and discharge of vaporized fuel to the atmosphere.

Other modifications and variations of the invention as hereinbefore set forth may be made without departing from the spirit and scope thereof, and therefore, only such limitations should be imposed as are indicated in the appended claims.

I claim:

1. A dispensing nozzle for transferring a volatile liquid from a pressurized source thereof, to a tank having a filling spout, said nozzle including a discharge tube defining an internal flow passage having an outlet at one end thereof, said tube being adapted to be removably registered within said filling spout, and manually operable valve means actuable to regulate liquid flow between the pressurized liquid source and said tank, the improvement therein of;

a resilient walled inflatable member carried on the outer surface of said nozzle discharge tube to be radially expanded into engagement with contiguous wall of said filling spout to form a substantially fluid-tight annular seal therewith, a transfer conduit communicating said inflatable member with said nozzle discharge tube at a junction point, for directing a stream of said volatile liquid into said inflatable member when said valve means is actuated to the open position, whereby to initiate liquid flow through said discharge tube, and means communicating with said tank to receive vapors from the latter when liquid is urged thereinto.

2. The improvement as defined in claim 1, including; liquid flow blocking means disposed in said discharge tube flow passage at a point downstream of said junction point to impede liquid flow therethrough and to establish a pressure differential across said flow blocking means.

3. The improvement as defined in claim 1, including; a flow restricting opening disposed in said flow passage at a point downstream at said junction point.

4. The improvement as defined in claim 3, wherein said flow restricting includes an orifice formed transversely of said flow passage discharge tube.

5. The improvement as defined in claim 1, wherein said inflatable member includes; a torus shaped element having inner and outer resilient walls, said inner wall being contractable to form a tight fit about the discharge tube outer surface, and said outer wall being expandable to engage a contiguous wall of said filling spout.

6. The improvement as defined in claim 5, wherein said torus shaped member is slidable along the surface of said discharge tube to be readily removable from the latter when in deflated condition.

* * * * *